3,030,410
PREPARATION OF OIL SOLUBLE SULFONATES

Joseph E. Woodbridge, Wynnewood, and Frederick R. Lawrence, Broomall, Pa., assignors to The Atlantic Refining Company, Philadelphia, Pa., a corporation of Pennsylvania
No Drawing. Filed July 22, 1959, Ser. No. 828,732
3 Claims. (Cl. 260—504)

This invention relates to new and useful improvements in the method of preparing oil soluble sulfonates. More particularly, this invention has to do with new and useful improvements in the method of preparing oil soluble sulfonates of a substantially reduced inorganic salt content.

As used in this specification and appended claims "oil soluble sulfonates" and related terms include all organic sulfonates having a substantial solubility in a petroleum hydrocarbon oil such as a paraffinic hydrocarbon oil or an oil produced in the destructive distillation of an oil shale. It also includes the so-called mahogany sulfonates and sulfonates prepared from polyalkylated benzenes of relatively high molecular weight.

"Inorganic salt content" and related terms include any residual inorganic salt contained in the sulfonate product and which salt results predominantly from a neutralization of the unreacted sulfuric acid used in the preparation of such oil soluble sulfonates.

It is well known that oil soluble sulfonates are particularly useful as additives for lubricating oils and particularly as additives for motor oils. In addition to imparting detergency characteristics to the oil, the oil soluble sulfonates are also useful when added to various oils as corrosion inhibitors, anti-oxidants, etc.

Oil soluble sulfonates prepared by existing commercial processes, however, usually contain a relatively high salt content (i.e., 1 to 2 percent). The presence of inorganic salt in a finished oil soluble sulfonate product has been found to be quite objectionable since the inorganic salt contained therein can produce a haze in the final product and also tends to incite corrosion in metallic structures and conveyances such as pipes, tanks, etc. As a result, purchasers of oil soluble sulfonates to be used as detergent additives in motor oils and other types of lubricating oils desire oil soluble sulfonate products containing as low a salt content as possible. Obviously, therefore, any practical processes for the production of oil soluble sulfonates containing a substantially lower salt content than that which can be obtained by existing commercial methods would present a substantial advancement in the art of preparing oil soluble sulfonates.

It is, therefore, an object of this invention to provide an improved process for the preparation of oil soluble sulfonates, such that the sulfonates thus prepared will have a substantially decreased inorganic salt content as compared to sulfonates prepared by known methods.

This and other objects of the present invention are realized by improving upon conventional processes for the preparation of oil soluble sulfonates to the extent that, after neutralization and prior to desalting, the sulfonates are subjected to a novel and unique treatment which comprises heating the sulfonates at elevated temperatures for prolonged periods of time.

Oil soluble sulfonates may be prepared by a number of methods, two of which are set forth below.

In the alkylation of benzene with a propylene tetramer fraction in the presence of a Friedel-Crafts catalyst such as $AlCl_3$, to produce a monododecyl benzene which is subsequently sulfonated for the preparation of detergents, emulsifiers, wetting agents, etc., there is also produced some polyalkylated benzenes and other materials of relatively high molecular weight (about 340–360) which have an ASTM boiling range of from 650° F. to 800° F. This mixture of polyalkylated benzenes and high molecular weight materials are separated from the main monoalkylated benzene product. These separated materials upon sulfonation either with concentrated (98 percent) or fuming sulfuric acid produce relatively high molecular weight oil soluble sulfonic acids. The sulfonic acids thus produced are subsequently neutralized with an alkali metal hydroxide such as sodium hydroxide, potassium hydroxide, etc., to form oil soluble sulfonates which are further purified by desalting with a suitable solvent such as alcohol or acetone.

Another source of oil soluble sulfonates which may be treated by the method of this invention are those obtained in a sulfuric acid treatment of petroleum oils. For example, a naphthenic distillate oil will yield upon treatment with concentrated or fuming sulfuric acid a sludge containing predominantly "green acids" and there will be contained in the oil phase a so-called "mahogany acid." The mahogany acids contained therein may be directly reacted with a stoichiometric amount of an alkali metal hydroxide to form oil soluble alkali metal sulfonates.

As stated above, a new and novel treatment of the oil soluble sulfonates has been found which will produce an oil soluble sulfonate product which contains a substantially reduced inorganic salt content. This treatment comprises, after neutralization and prior to desalting, heating the sulfonates at elevated temperatures for prolonged periods of time. It has been found that by heating a neutralized oil soluble sulfonate product under essentially anhydrous conditions at a temperature up to 150° C. a product will be produced which has an inorganic salt content substantially lower than that attainable by existing commercial processes for the preparation of such materials.

It is essential to this invention that this heating step be performed on a neutral sulfonate product. If the sulfonates are heated under either acid or alkaline conditions products are obtained which are extremely poor in color and/or odor. If the sulfonic acids are heated at temperatures approximating 150° C. under strong acid conditions, the sulfonic acids decompose to form the parent hydrocarbon and free sulfuric acid. At this temperature, the free sulfuric acid tends to oxidize the hydrocarbon and thus produce odorous products containing black colored tars.

Similarly if the sulfonates are heated at temperatures of approximately 150° C. under strong alkaline conditions the sulfonates tend to react with the caustic to form free salt and phenolic compounds. Phenolic compounds are extremely susceptible to air oxidation, usually forming dark color quinoid type materials.

It is quite obvious that a pH adjustment of the sulfonate product after desalting can result in the formation of additional salt by the attendant neutralization reaction. Thus, it is highly desirable, essential, and critical to this invention that the final pH adjustment be made prior to desalting. Furthermore, since the final sulfonate product is a highly viscous, non-aqueous type material having an extremely low water content, any attempt to neutralize the final sulfonate product would not only be extremely difficult but could result in a product which would require further processing in order to give it a desirable water and reduced salt content.

It is also important that the heating of these neutral oil soluble sulfonates be conducted under essentially anhydrous conditions. It has been found that an amount of water less than one percent is tolerable in the practice of this invention. Although the exact reason why this essentially anhydrous condition must be present to produce a product having a greatly reduced salt content as compared with that previously obtainable is not certain, it is believed that the colloidal nature of the product under treatment may contribute to this critical aspect of this invention. It is believed that water, trapped in micelles in the colloidal dispersion, carries with it inorganic salt and, unless this dispersion is broken up by removing the water, this trapped salt passes through the desalting step and ultimately appears in the final product.

In the practice of this invention, the neutral oil soluble sulfonates are heated from a temperature from about 120° to 150° C. preferably from a temperature from about 140° to about 150° C. for a period of time ranging between about 30 minutes and six hours, and most preferably from a temperature between 145° to 150° C. for a period of time ranging between about one hour and two hours. This upper temperature level of 150° C. has been found to be extremely critical in the practice of this invention. If the temperature is allowed to go above 150° C., the product in certain instances will tend to decompose, particularly if heated under alkaline conditions. In addition, the color of the ultimate product would be substantially darkened.

The following examples are intended as illustrative of the present invention and are not to be considered limitative.

EXAMPLE I

Benzene was alkylated with a propylene tetramer according to the conventional commercial aluminum chloride catalytic method. After removing a dodecyl benzene fraction 100 cc. of the residue which was composed of polyalkylated benzenes and other high molecular weight aromatic materials were treated with 75 volume percent of 20 percent fuming sulfuric acid at a temperature of about 160° F. The produced oil soluble sulfonic acids were then neutralized with aqueous sodium hydroxide at an elevated temperature to a pH of 7.0, thus forming the neutral oil soluble sodium sulfonates which were heated at 145° C. for 1½ hours. The crude sulfonate product was then dissolved in about 450 cc. acetone, which precipitated the free sodium sulfate which was removed by filtration and the acetone was subsequently removed from the product by evaporation. The residual salt content of the finished neutral product was measured by the Shell Salt Analysis as published in Industrial and Engineering Chemistry, volume 18, page 544, September 15, 1946. The results of this analysis are presented in Table I below.

EXAMPLE II

Another portion of the oil soluble sulfonic acids was prepared as in Example I. This sulfonic acid was then neutralized with aqueous sodium hydroxide at an elevated temperature to a pH of 11.0 and heated at 145° C. for 1½ hours. The crude sulfonate product was desalted as in Example I and analyzed for residual salt content by the Shell Salt Analysis. The results of this analysis are presented in Table I below.

EXAMPLE III

A third portion of oil soluble sulfonic acids was prepared as in Example I and neutralized with aqueous sodium hydroxide at an elevated temperature to a pH of about 4 and then heated at 145° C. for 1½ hours. The crude sulfonate product was desalted as in Example I and analyzed for residual salt content by the Shell Salt Analysis. The result of this analysis are presented in Table I below.

Table I

| | pH after neutralization | Residual Salt Analysis, percent |
|---|---|---|
| Sulfonate from Example I | 7.0 | 0.3 |
| Sulfonate from Example II | 11.0 | 0.56 |
| Sulfonate from Example III | 3.78 | 1.16 |

It is clearly apparent from the above data that when a sulfonate product is neutralized to a pH of 7.0 and heated at a temperature of about 145° C. for between one hour and two hours according to the process of this invention, a product is produced which is far superior in respect to residual inorganic salt content as compared to sulfonate products treated under either acid or alkaline conditions.

We claim:

1. In a process for preparing oil soluble sulfonates having a substantially reduced inorganic salt content including the steps of sulfonating an oil having a molecular weight greater than 340 selected from the group consisting of a naphthenic distillate oil and a polyalkylated benzene with a sulfonating agent selected from the group consisting of concentrated sulfuric acid and fuming sulfuric acid, neutralizing the produced oil soluble sulfonic acids with an alkali metal hydroxide, desalting the neutralized oil soluble alkali metal sulfonates with a water miscible solvent, filtering to remove the precipitated inorganic salt and removing the solvent to obtain an essentially pure oil soluble alkali metal sulfonate, the improvement of neutralizing the oil soluble sulfonic acids with a stoichiometric amount of an alkali metal hydroxide and heating the neutral oil soluble alkali metal sulfonates under essentially anhydrous conditions at a temperature between about 120° C. and about 150° C.

2. A process according to claim 1 wherein the neutral oil soluble alkali metal sulfonates are heated at a temperature of from about 140° C. to about 150° C. for a period of time ranging between about 30 minutes and 6 hours.

3. In a process for preparing oil soluble sulfonates having a substantially reduced inorganic salt content including the steps of sulfonating an oil having a molecular weight greater than 340 selected from the group consisting of a naphthenic distillate oil and a polyalkylated benzene with a sulfonating agent selected from the group consisting of concentrated sulfuric acid and fuming sulfuric acid, neutralizing the produced oil soluble sulfonic acids with an alkali metal hydroxide, desalting the neutralized oil soluble alkali metal sulfonates with a water miscible solvent, filtering to remove the precipitated inorganic salt and removing the solvent to obtain an essentially pure oil soluble alkali metal sulfonate, the improvement of neutralizing the oil soluble sulfonic acids to a pH of about 7.0 with an alkali metal hydroxide and heating the neutral oil soluble alkali metal sulfonates under essentially anhydrous conditions at a temperature between about 145° C. and about 150° C. for a period of time ranging between about 1 hour to about 2 hours.

References Cited in the file of this patent

UNITED STATES PATENTS

| 2,832,801 | Bernstein | Apr. 29, 1958 |
| 2,847,459 | Mitchell | Aug. 12, 1958 |